United States Patent
Babazadeh et al.

(10) Patent No.: US 9,822,765 B2
(45) Date of Patent: Nov. 21, 2017

(54) WIND POWER PLANT CONTROL SYSTEM

(75) Inventors: Mehrdad Babazadeh, Zanjan (IR); Kouroush Nayebi, Ikast (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 65 days.

(21) Appl. No.: 14/421,361

(22) PCT Filed: Aug. 15, 2012

(86) PCT No.: PCT/DK2012/050296
§ 371 (c)(1),
(2), (4) Date: Feb. 12, 2015

(87) PCT Pub. No.: WO2014/026689
PCT Pub. Date: Feb. 20, 2014

(65) Prior Publication Data
US 2015/0219074 A1   Aug. 6, 2015

(51) Int. Cl.
*F03D 7/02* (2006.01)
*F03D 7/04* (2006.01)
*H02J 3/38* (2006.01)

(52) U.S. Cl.
CPC ............... *F03D 7/045* (2013.01); *F03D 7/02* (2013.01); *F03D 7/042* (2013.01); *F03D 7/048* (2013.01); *H02J 3/386* (2013.01); *Y02E 10/723* (2013.01)

(58) Field of Classification Search
CPC . F03D 7/02; F03D 7/042; F03D 7/045; F03D 7/048; H02J 3/386; Y02E 10/723
See application file for complete search history.

(56) References Cited

U.S. PATENT DOCUMENTS

| | | | | |
|---|---|---|---|---|
| 5,657,261 A | * | 8/1997 | Wilson | G06F 17/17 341/61 |
| 7,836,229 B1 | * | 11/2010 | Singh | G06F 9/5016 710/52 |
| 7,902,686 B2 | * | 3/2011 | Andersen | F03D 7/0272 290/44 |
| 8,014,879 B2 | * | 9/2011 | Latham | H02M 3/157 323/283 |

(Continued)

OTHER PUBLICATIONS

International Search Report for PCT/DK2012/050296, dated May 10, 2013.

*Primary Examiner* — Jennifer L Norton
(74) *Attorney, Agent, or Firm* — Patterson + Sheridan, LLP

(57) ABSTRACT

The invention relates to a wind power plant control system arranged for controlling one or more wind turbine generators in a wind power plant, wherein the wind power plant control system comprises a power plant controller and a modeling unit, the modeling unit being operatively coupled to the power plant controller. The modeling unit is arranged to calculate estimated values of electrical output parameters from the one or more wind turbine generators, and to output said estimated values to the power plant controller. The power plant controller is arranged for determining reference signals for dispatching to the one or more wind turbine generators, wherein the estimated values of said electrical output parameters are used by the power plant controller in the determination of said reference signals. The invention also relates to a corresponding method of controlling a wind power plant.

11 Claims, 5 Drawing Sheets

(56) References Cited

U.S. PATENT DOCUMENTS

| | | |
|---|---|---|
| 2006/0273938 A1* | 12/2006 | Van Den Enden ............... H03H 17/0685 341/61 |
| 2009/0267572 A1* | 10/2009 | Engelhardt ............. H02P 23/26 322/61 |
| 2010/0078940 A1 | 4/2010 | Kondo et al. |
| 2010/0213409 A1 | 8/2010 | Bittner et al. |
| 2010/0312409 A1 | 12/2010 | Zeumer et al. |
| 2011/0148114 A1* | 6/2011 | Garcia ................... H02J 3/386 290/44 |
| 2011/0204635 A1 | 8/2011 | Miller |
| 2011/0224926 A1* | 9/2011 | Morjaria ................ F03D 7/028 702/60 |
| 2012/0139243 A1* | 6/2012 | Koerber ............... F03D 7/0284 290/44 |
| 2012/0143537 A1 | 6/2012 | Nielsen |
| 2012/0205912 A1* | 8/2012 | Wakasa ................. F03D 9/003 290/44 |
| 2013/0106107 A1* | 5/2013 | Spruce ................. F03D 7/0224 290/44 |

\* cited by examiner

WIND POWER PLANT CONTROL SYSTEM

FIELD OF THE INVENTION

Embodiments of the invention generally relate to a wind power plant control system and a method of controlling a wind power plant.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. A plurality of wind turbines generators may be arranged together in a wind park or wind power plant to generate sufficient energy to support an electrical grid. A wind power plant may be located onshore or offshore, and it often covers large geographical areas. Each wind turbine generator typically includes or is connected to a wind turbine controller, and the wind power plant typically includes a central controller, often referred to as a power plant controller, central controller or master controller, operatively coupled to the wind turbine controllers of the individual wind turbine generators. The power plant controller is arranged to receive information from the wind turbine controllers, e.g. in relation to the power output and/or measurement values from the wind turbine generators, and the power plant controller is arranged to transmit information to the wind turbine generators, e.g. in order to obtain a requested output from the wind turbine generators.

These factors usually render it necessary to provide a variety of networked interconnections and communication technologies for monitoring and controlling the wind power electric generating facilities.

In a wind power plant with a plurality of wind turbine generators, the focus has moved away from the separate wind turbine generator connection points to the central wind power plant connection point, often referred to as the "point of common coupling". One limiting factor when performing central control of a wind power plant with several wind turbine generators is the time it takes to gather and condition information from the individual wind turbine generators, transmitting the information to the central controller or power plant controller and distributing control data, e.g. new active or reactive power set points from the power plant controller to the wind turbine controllers.

SUMMARY OF THE INVENTION

Embodiments of the invention generally relate to a wind power plant control system, a wind power plant including a wind power plant control system and a method for controlling a wind power plant.

One embodiment of the invention provides a wind power plant control system arranged for controlling one or more wind turbine generators in a wind power plant. The wind power plant control system comprises a power plant controller and a modeling unit, the modeling unit being operatively coupled to the power plant controller. The modeling unit is arranged to calculate estimated values of electrical output parameters from the one or more wind turbine generators, and to output said estimated values to the power plant controller. The power plant controller is arranged to determine reference signals for dispatching to the one or more wind turbine generators, wherein the estimated values of said electrical output parameters are used by the power plant controller in the determination of said reference signals. The power plant controller is arranged to dispatch the determined reference signals to the one or more wind turbine generators.

Another embodiment of the invention provides a method of controlling wind power plant comprising one or more wind turbine generators by a wind power plant control system comprising a power plant controller and a modeling unit, where the modeling unit is operatively coupled to the power plant controller. The method comprises the steps of: in the modeling unit, calculating estimated values ($y_1$, $y_2$, ..., $y_n$) of electrical output parameters from the one or more wind turbine generators; and outputting said estimated values from the modeling unit to the power plant controller. The method further comprises the step of, in the power plant controller and by use of said electrical output parameters, determining reference signals for dispatching to the one or more wind turbine generators. The method may also comprise the step of actually transmitting the reference signals from the power plant controller to the one or more wind turbine generators.

Other features are inherent in the methods and product disclosed or will become apparent to those skilled in the art from the following description and the accompanying drawings.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

Figure 1:
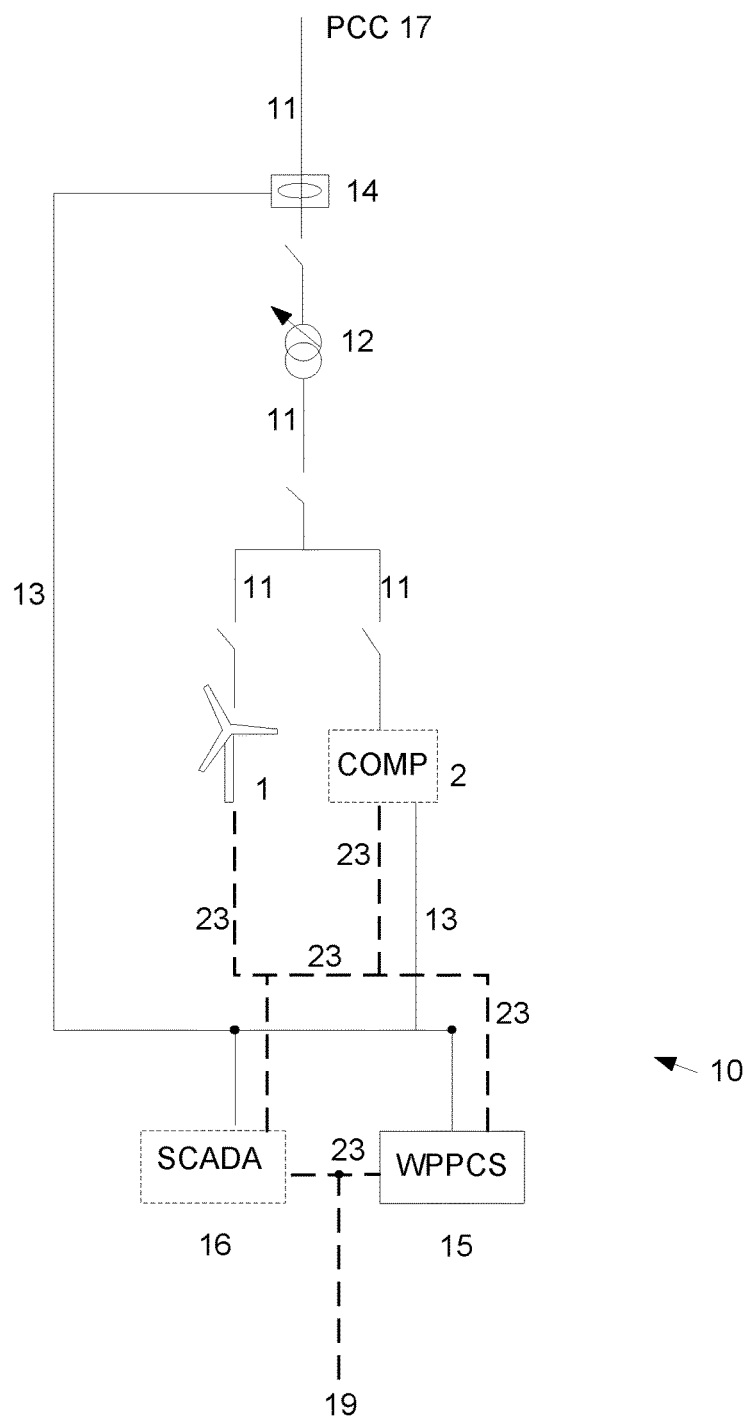
FIG. 1 illustrates a simplified view of a wind power plant.

In the following, reference is made to embodiments of the invention. However, it should be understood that the invention is not limited to specific described embodiments. Instead, any combination of the following features and elements, whether related to different embodiments or not, is contemplated to implement and practice the invention. Throughout the figures, similar reference signs are meant to denote similar entities.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention"

shall not be construed as a generalization of any inventive subject matter disclosed herein and shall not be considered to be an element or limitation of the appended claims except where explicitly recited in a claim(s).

Before turning to the detailed description of embodiments on the basis of the drawings, a few more general items of embodiments will be discussed.

One embodiment of the invention provides a wind power plant control system arranged for controlling one or more wind turbine generators in a wind power plant. The wind power plant control system comprises a power plant controller and a modeling unit, the modeling unit being operatively coupled to the power plant controller. The power plant controller is arranged for determining reference signals for dispatching to the one or more wind turbine generators. The modeling unit is arranged to calculate estimated values of electrical output parameters from the one or more wind turbine generators, and to output said estimated values to the power plant controller. The estimated values of said electrical output parameters are used by the power plant controller in the determination of said reference signals. The power plant controller is arranged to dispatch the determined reference signals to the one or more wind turbine generators.

The wind power plant system according to the invention comprises a power plant controller and a modeling unit. The power plant controller and the modeling unit may be part of one and the same processing unit, or they may be separate units that are operatively coupled to each other.

The reference signals for dispatch from the power plant controller to the one or more wind turbine generators may be individual reference signals, i.e. the one or more wind turbine generators may receive differing reference signals, or common or equal reference signals sent to each of the one or more wind turbine generators.

The term "electrical output parameters" is meant to denote any relevant parameter in relation to the electrical output from the wind turbine generator. Electrical output parameters may e.g. include active power, reactive power, power factor, frequency of an electrical signal, voltage and/or amperage of the electric output from the one or more wind turbine generators.

The modeling unit is arranged to calculate estimated values of electrical output parameters from the one or more wind turbine generators, and to output said estimated values to the power plant controller, and the power plant controller is arranged for using these estimated values in the determination of the reference signals to be dispatched to the one or more wind turbine generators. Hereby, it is possible to avoid a control loop wherein measurements signals on the electrical output parameters from the one or more wind turbine generators are delayed due to signal conditioning and communication delays. Signal conditioning occurs e.g. in order to avoid noise and/or to perform internal wind turbine control loops, and wherein the communication delays occur due to transmission time from the one or more wind turbine generators to the power plant controller. An advantage by the system of the invention is that a faster control loop may be obtained. A faster control loop may render a wind power plant with larger robustness, faster reaction and wherein power oscillations may be avoided in that fast responses may be performed more precisely, e.g. without overshoot. Thus, a wind power plant with more stability, a faster responses and/or a higher performance may be provided.

In an embodiment of the wind power plant control system, the power plant controller is arranged to also dispatch the reference signals to the modeling unit, and the modeling unit is arranged to calculate said estimated values based at least partly on said reference signals from the power plant controller. Hereby, reference signals similar to those sent to the one or more wind turbine generators are also sent to the modeling unit. The modeling unit thus gets updated reference signals and may use these updated reference signals for providing the estimated values of the electrical output parameters from the one or more wind turbine generators based on the updated reference signals.

The modeling unit of the wind power plant control system may be arranged to receive measured values of said electrical output parameters from the wind turbine generators, and the modeling unit may comprise a comparator arranged to generate an estimation error signal indicative of the difference between said measured values and said estimated values of the electrical output parameters. This estimation error signal may be used by the modeling unit to update the model used by the modeling unit for estimating the values of the electrical output parameters. Transmitting measured values of the electrical output parameters to the modeling unit renders it possible for the modeling unit to compare with the corresponding generated estimated values, and thus to update the model in case of discrepancies. Hereby, the precision of the estimated values to be generated by the modeling unit is enhanced.

In the wind power plant control system, the measured values of said electrical output parameters from the one or more wind turbine generators are transmitted at a first sampling rate, and the model unit is arranged for outputting the estimated values at a second sampling rate, the second sampling rate being higher than the first sampling rate. Advantageously, the second sampling rate may be at least an order of magnitude higher than the first sampling rate. Typically, the first sampling rate is determined by the time used for signal conditioning within the one or more wind turbine generators, e.g. filtering, signal averaging, as well as communication time from the one or more wind turbine generators to the wind power plant control system. The second sampling rate may be substantially higher than the first sampling rate, corresponding to a substantially shorter sampling time, in that a calculation time takes the place of signal conditioning, where the calculation time typically is substantially shorter than the signal conditioning time, and in that the communication time may be substantially shorter, because the modeling unit may be placed in the vicinity of or may even be integrated in the power plant controller. As an example, the first sampling time may be of the order 1-2 seconds, corresponding to a sampling rate of 0.5-1 Hz, whilst the second sampling time is of the order 100 milliseconds corresponding to a sampling time of the order of 10 Hz.

The reference signals determined by the power plant controller of wind power plant control system may be reference signals on active power (P) and/or reactive power (Q). Hereby, the P and/or Q loop of a power plant controller and connected wind turbine generators is/are emulated by the wind power plant control system of the invention. It should be noted, however, that the reference signals determined by the power plant controller and dispatched to one or more wind turbine generators may be any relevant reference signals, thus in addition to or as an alternative to reference signals on active power and/or reactive power, reference signals on power factor, frequency, or other relevant power characteristics in relation to on the electrical output from the individual wind turbine generators.

The modeling unit may comprise an electrical model of the one or more wind turbine generators (WTG) of a wind power plant and the electrical grid inside the wind power plant. Alternatively, the modeling unit may comprise an aggregated model of the wind power plant. An electrical model of the individual wind turbine generators and the electrical grid inside the wind power plant may give a high precision in the calculation of the estimated values of electrical output parameters from the one or more wind turbine generators, whilst an aggregated model of the wind power plant, viz. the wind turbine generators, the grid inside the wind power plant as well as any other relevant component of the wind power plant, may provide a smaller calculation time, corresponding to a higher sampling rate/a lower sampling time.

The method of the invention entails similar features and advantages as described in connection with the wind power plant control system.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

FIG. 1 illustrates a simplified view of a wind power plant 10. The exemplary wind park 10 of FIG. 1 has a plurality of wind turbine generators 1; however, due to simplicity of the figure only one wind turbine generator 1 is shown in FIG. 1. The number of wind turbine generators 1 in the wind power plant may be any appropriate number, e.g. any number between 2 and hundreds, e.g. 10, 20, 50 or 100 wind turbine generators. The wind power plant 1 may optionally comprise compensation equipment 2 arranged to provide reactive power in addition to reactive power generated by the wind turbine generators. The compensation equipment may be a static synchronous compensator (STATCOM), a static VAR compensator (SVC), such as a mechanically switched capacitor, or any other device arranged for supporting the electrical grid and/or providing reactive power.

Each wind turbine generator 1 has a rotor with rotor blades rotatably supported in a nacelle which is mounted on a tower. The rotor is arranged to drive a generator. The electric current produced by the generator may be converted by a converter to a current adapted to the fixed grid frequency, e.g. by a full-scale converter or a converter of a doubly-fed induction generator (DFIG). The converter enables current to be produced with an arbitrary phase, as desired, relative to the grid voltage, thereby enabling variable reactive power to be produced. The converter also allows the voltage amplitude produced to be varied within certain limits. Each wind turbine generator has a local controller that commands the wind turbine generator to produce electricity with a specific phase and voltage.

Each wind turbine generator 1 has terminals at which the wind turbine generator outputs the electric power produced. The wind turbines generators 1 of the wind park 10 are electrically connected to a point of common coupling (PCC) 17 by a wind-park-internal grid 11. The internal grid has a tree-like structure in which the wind turbine generators 1 or, more specifically, the terminals of the individual wind turbine generators, form the leaves of the tree, and the point of common coupling (PCC) 17 forms the root of the tree. The internal grid is typically a medium voltage grid, and the electrical output from the wind turbine generators 1 are transformed to a high voltage by transformer 12 located downstream of the point of common coupling (PCC) 17.

The point of common coupling PCC 17 is the point where the wind park is electrically connected to the utility grid (not shown in FIG. 1), more specifically to an external branch line which leads to the utility grid. For an off-shore wind park the external branch line may be an undersea line which connects the wind park 10 to the utility grid on land.

The wind park 10 is equipped with a wind power plant control system 15. The wind power plant control system 15 communicates with the individual wind turbine generator 1's controllers via a control network 23. The control network 23 is, for example, implemented as a bus system, i.e. a CAN bus or an Ethernet bus. In FIG. 1, control lines are drawn as broken lines to distinguish them from power-grid lines 11 and measurement lines 13 drawn as full lines.

The wind power plant control system WPPCS 15 has several inputs, two of which are illustrated in FIG. 1. One of the inputs is an external control input 19 through which an external entity, e.g., a utility grid operator can provide a prescription or demand information pertaining to the electricity to be delivered by the wind power plant 10. For example, the utility-grid operator can demand that the wind power plant 10 delivers a certain voltage V or amount of reactive power Q at the PCC 17. Other demands by the utility-grid operator may be an upper limit on the active power produced by the wind park 10, e.g. in the case of an over-frequency in the utility grid. The information signal for the external control input 19 is not necessarily a demand signal; in some embodiments it is a functional parameter which defines the central controller's response to parameters measured in the wind park 10. For example, in some embodiments it is the slope of a droop function defining a mapping of measured voltage to reactive power to be produced. Moreover, an external control input may be received from a supervisory control and data acquisition system (SCADA) 16.

The second input to the wind power plant control system WPPCS 15 illustrated in FIG. 1 is a central measurement input obtained from a point of measurement 14 and transmitted over measurement lines 13. The signal of the second input is, for example, a signal representing the voltage and/or reactive power measured at the point of measurement 14, which may be, for example, at the PCC 17. Alternatively, the point of measurement 14 where the voltage and/or reactive power is measured may be upstream of the PCC 17 in the internal grid, or downstream the PCC 17.

The wind power plant control system WPPCS 15 has a reference output to the control network 23.

The local wind-turbine generator's controllers have several inputs. One of the inputs is a reference input from the control network. The second input is a local measurement input. The signal representing the local measurement input may be the voltage and/or reactive power measured at the terminals of the associated wind turbine 1.

Both the wind power plant control system 15 and the local wind turbine generator's controllers may be feedback controllers which compare two inputs and produce a control signal based on the difference between the two inputs.

The control network 23 is a bi-directional network enabling two-way communication between the wind power plant control system 15 and the individual wind turbine generator 1's controllers. For example, the downlink direction (i.e. the direction from the wind power plant control system 15 to the individual wind turbine generator 1's controllers) may be used to send reference values, e.g., for voltage and/or reactive power, from the wind power plant control system 15 to the individual wind turbine generator 1's. The uplink direction may be used by the wind turbine generators 1 to return information about their current operational state, e.g. about the amount of active power currently produced, to the wind power plant control system 15.

The reference output by the wind power plant control system 15 is, in some embodiments, a common reference value to all the wind turbine generators 1. In those embodiments, all the wind turbines 1 of the wind park 10 are requested to produce the same voltage or reactive power, according to the common reference value. In other embodiments, the wind turbine generators 1 receive individual reference values from the wind power plant control system 15. For example, when some of the wind turbine generators 1 have informed the wind power plant control system 15 that they are operating at nominal power while other wind turbines 1 have informed the wind power plant control system 15 that they are operating at partial load (i.e. below nominal power) the wind power plant control system 15 can make use of a current margin still left in the converter of the partial-load wind turbine generators 1 by requesting them, e.g. to produce more reactive power than the wind turbine generators operating at nominal power.

The wind power plant 10 may be connected to a SCADA (supervisory control and data acquisition) system 16 arranged to monitor and/or control the wind power plant. The SCADA system may provide input to the wind power plant control system 15 and it may receive input from the wind turbine generators 1.

In FIG. 1, the SCADA system 16 and the compensation unit 2 are shown with broken lines in order to indicate that they are optional.

Figure 2:
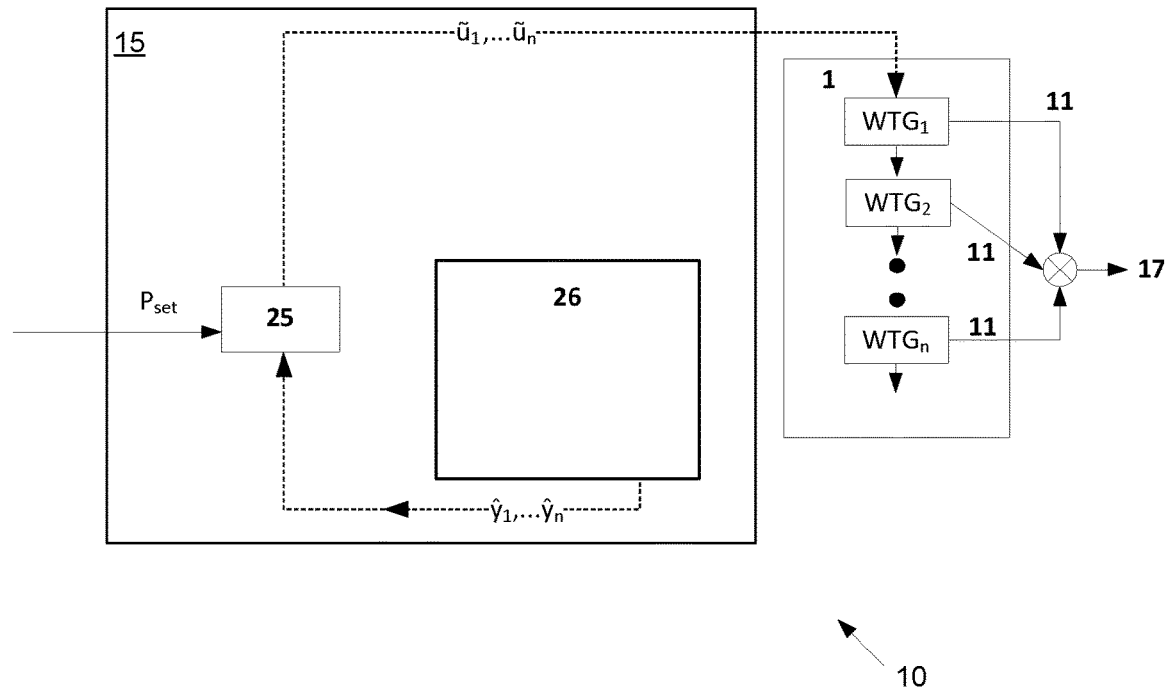
FIGS. 2 to 4 illustrate schematic views of a wind power plant control system according to the invention.
Figure 3:
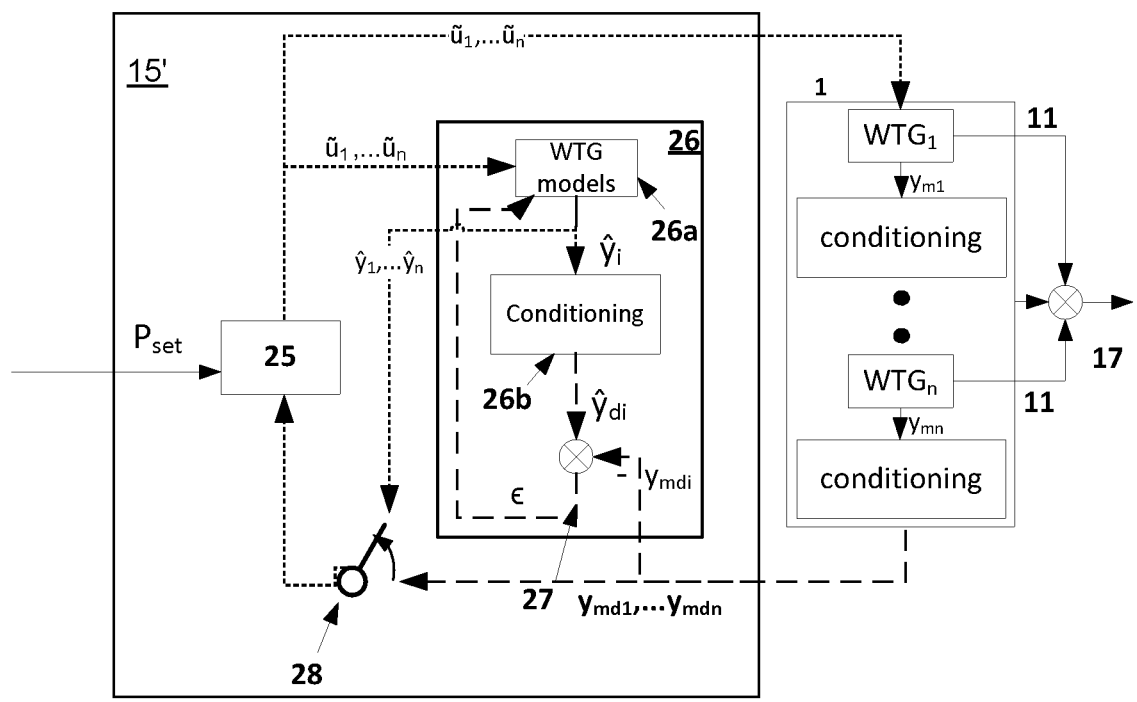
Figure 4:
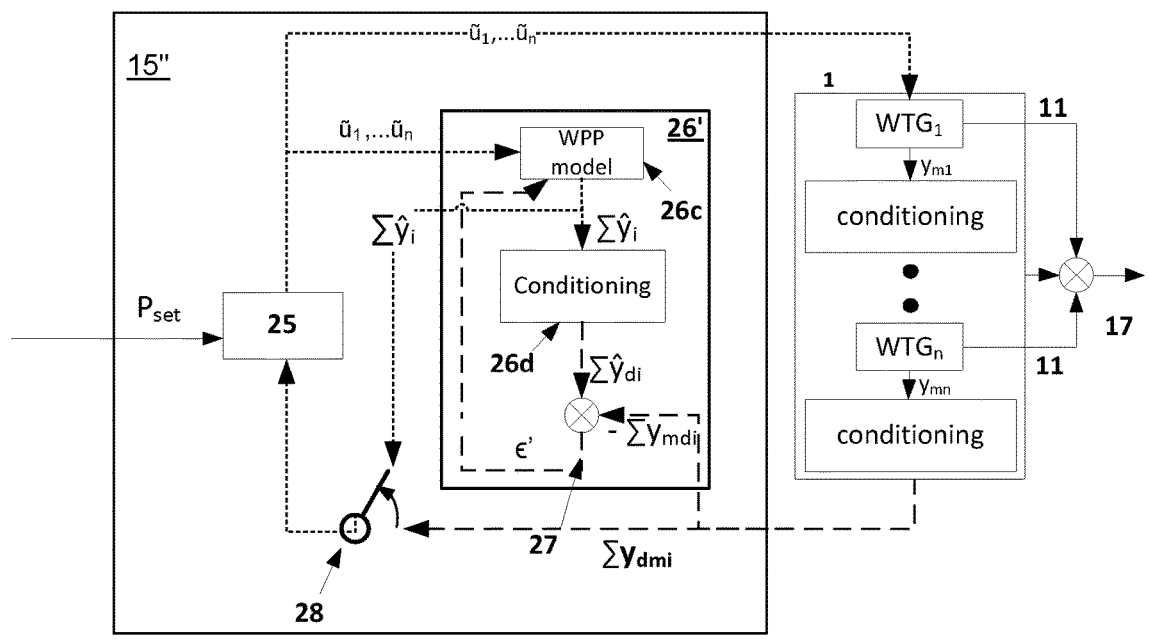

FIGS. 2-4 illustrate schematic views of a wind power plant control system according to the invention together with N wind turbines 1 ($WTG_1$, $WTG_2$, ..., $WTG_n$) connected to a point of common coupling 17 by means of electrical lines 11.

The wind power plant control system 15 of FIG. 2 comprises a power plant controller 25 and a modeling unit 26. Even though the power plant controller 25 and the modeling unit 26 are shown as two separate entities, it should be noted that the modeling unit 26 may be a part of or integrated in the power plant controller 25.

The power plant controller 25 is arranged to create reference signals $\tilde{u}_1, \ldots \tilde{u}_n$ and to dispatch the reference signals $\tilde{u}_1, \ldots \tilde{u}_n$ to the N wind turbine generators $WTG_1$, $WTG_2$, ..., $WTG_n$ of the wind power plant 10, so that a reference signal $\tilde{u}_j$ is dispatched to the j'th wind turbine generator $WTG_j$. The N wind turbine generators $WTG_j$, $WTG_2$, ..., $WTG_n$ are arranged to deliver their electrical output to an electrical grid connected to the point of common coupling 17 via the electrical power network 11.

From e.g. a utility grid operator or a SCADA system, the power plant controller 25 receives a set point, e.g. a set point $P_{set}$ in relation to active power to be output from the wind power plant 10. The power plant controller also receives as input estimated values $\hat{y}_1, \ldots \hat{y}_n$ on the electrical output parameters from the wind turbines generators $WTG_1$, $WTG_2$, ..., $WTG_n$, where the estimated values $\hat{y}_1, \ldots \hat{y}_n$ are determined by the modeling unit 26, and wherein an estimated value $\hat{y}_j$ relates to estimated values from the j'th wind turbine generator $WTG_j$. Based at least on the estimated values $\hat{y}_1, \ldots \hat{y}_n$ of the electrical output parameter from the wind turbine generators $WTG_1$, $WTG_2$, ..., $WTG_n$ and the power set point $P_{set}$, the power plant controller 25 determines the control values or reference signals $\tilde{u}_1, \ldots \tilde{u}_n$ to the N wind turbine generators $WTG_1$, $WTG_2$, ..., $WTG_n$ of the wind power plant 10 and dispatches the control values or reference signals $\tilde{u}_1, \ldots \tilde{u}_n$ to the N wind turbine generators $WTG_1$, $WTG_2$, ..., $WTG_n$ of the wind power plant 10. In FIG. 2 the communication network on which the control values or reference signals $\tilde{u}_1, \ldots \tilde{u}_n$ and the estimation values $\hat{y}_1, \ldots \hat{y}_n$ are sent, is shown in a dotted line, whilst the electrical power network 11 is drawn in continuous line. Even though neither FIG. 2 nor 3 discloses compensation units, it is noted that if such compensation units are included in the wind power plant 10, the simulations or calculations carried out by the modeling unit 26 may include estimation of the contribution of such compensation units.

It should be noted that even though FIG. 2 shows that the setpoint received by the wind power plant control system 15 and thus by the power plant controller 25 is a setpoint in relation to active power, any other relevant setpoint could be input to the power plant controller, e.g. a setpoint on reactive power, a power factor setpoint.

The model used by the modeling unit 26 in order to determine the estimated values values $\hat{y}_1, \ldots \hat{y}n$ of the electrical output parameter from the wind turbine generators $WTG_1$, $WTG_2$, ..., $WTG_n$ may be any appropriate model simulating the wind turbine generator behavior, any delays due to the signal conditioning and communication. Such signal condition may include moving averaging and/or averaging in general. The model may also include simulation of the electrical grid inside the wind power plant.

FIG. 3 illustrates a schematic view of a wind power plant control system 15' according to the invention together with N wind turbines 1, indicated by $WTG_1, \ldots, WTG_n$, connected to a point of common coupling PCC 17 by electrical lines 11. The wind power plant control system 15' has many components in common with the wind power plant control system 15 shown in FIG. 2. Similar reference signs are meant to denote similar entities. Entities shown in FIG. 3 but already described in relation to FIG. 2 will not be described again in detail.

As described in relation to FIG. 2, the wind power plant control system 15' comprises a power plant controller 25 and a modeling unit 26. FIG. 3 shows that the modeling unit 26 comprises wind turbine generator modeling block 26a including wind turbine models for the one or more wind turbine generators 1 of the wind power plant 10 as well as a conditioning block 26b. Estimated values $\hat{y}_1, \ldots \hat{y}_n$ of the electrical output parameter from the wind turbine generators $WTG_1, WTG_2, \ldots, WTG_n$ are output from the wind turbine generator modeling block 26a. These estimated values $\hat{y}_1, \ldots \hat{y}_n$ are sent from the wind turbine generator modeling block 26a to the power plant controller. The estimated values are also sent to the conditioning block 26b (shown in FIG. 3 as reference $\hat{y}_i$). The conditioning block 26b estimates the influence of delays in the wind power plant 1 on the estimated values $\hat{y}_1, \ldots \hat{y}_n$, due to e.g. conditioning and/or communication delays, resulting in delayed estimated values $\hat{y}_{di}$. The reference sign $\hat{y}_{di}$ is meant to denote a plurality of delayed estimated values $\hat{y}_{d1}, \hat{y}_{d2}, \hat{y}_{d3}, \ldots, \hat{y}_{dn}$, one for each of the n wind turbines $WTG_1$ to $WTG_n$. These delayed estimated values $\hat{y}_{di}$ are outputted from the conditioning block 26b to a comparator unit 27.

The comparator unit 27 also receives measured signals $y_{md1}, \ldots, y_{mdn}$ from the wind turbine generators 1. Each of the signals $y_{md1}, \ldots, y_{mdn}$ emanate from a corresponding wind turbine generator $WTG_1$ to $WTG_n$, so that the signal $y_{mdj}$ emanate from the j'th wind turbine generator $WTG_j$. As indicated in block 1 of FIG. 3, the raw measured signal $y_{mj}$ from the j'th wind turbine generator $WTG_j$ is conditioned in a conditioning block, and the result sent to the modeling unit 26 of the wind power plant control system 15' is a conditioned and delayed (due to communication times within the wind power plant) signal indicated by the term $y_{md1}, \ldots, y_{mdn}/y_{mdj}$, wherein the signals $y_{md1}, \ldots, y_{mdn}$ are measured signals from the wind turbine generators $WTG_1$ to $WTG_n$, influenced by the inherent conditioning and delay in the wind power plant.

The comparator unit 27 is arranged to compare the delayed estimated values $\hat{y}_{d1}$ with conditioned delayed measured signals $y_{md1}, \ldots, y_{mdn}$ from the wind turbine generators 1, resulting in an error signal $\epsilon$. The error signal $\epsilon$ is output from the comparator unit 27 to the turbine generator modeling block 26a, rendering it possible to perform a model plausibility check. Any perturbation of the model from the actual wind turbine performance is detected by the estimation error signal E. Hereby, the model used by the wind turbine generator modeling block 26a may be updated at the rate of measurement of electrical output parameters from the wind turbine generators, e.g. every second.

In FIG. 3 a switch 28 is shown, indicating that the measured signals $y_{md1}, \ldots, y_{mdn}$ from the wind turbine generators 1 could be input directly to the power plant controller 25 instead of the modeling unit 26. This would correspond to a bypassing of the modeling unit.

As an example, only, the sampling rates involved in the wind power plant control system 15' and the wind turbine generators 1 shown in FIG. 3a could be as follows:

Estimated values $\hat{y}_1, \ldots \hat{y}_n$ of the electrical output parameter from the wind turbine generators $WTG_1, \ldots, WTG_n$ are output from the wind turbine generator modeling block 26a every 100 ms The power plant controller 25 will work with a corresponding loop time, 100 ms, and send reference signals $\tilde{u}_1$ to the N wind turbine generators 1 ($WTG_1, \ldots, WTG_n$) of the wind power plant 10 accordingly.

Measured data ($y_{md1}, \ldots y_{mdn}$) are sent every 1 second from the wind turbine generators to the modeling unit 26.

the wind turbine model of the wind turbine generator modeling block 26a is updated every 1 second to ensure correct estimation for the next 10 intermediate steps with 100 ms sampling rate.

FIG. 4 illustrates another schematic view of a wind power plant control system 15" according to the invention together with N wind turbines 1, indicated by $WTG_1, \ldots, WTG_n$, connected to a point of common coupling 17. The wind power plant control system 15" differs from the wind power plant control system 15' due to differences between the modeling unit 26 of FIG. 3 and the modeling unit 26' shown in FIG. 3. The features in common with the wind power plant control system 15 shown in FIG. 2 and/or the wind power plant control system 15' shown in FIG. 3 will not be described again in detail.

The modeling unit 26' comprises a wind power plant modeling block 26c as well as a conditioning block 26d. Whilst the wind turbine generator modeling block 26a of FIG. 3 included wind turbine models for the one or more wind turbine generators 1 of the wind power plant 10, the wind power plant modeling block includes an aggregated model for the wind power plant as a whole, i.e. for the wind turbine generators $WTG_1, WTG_2, \ldots, WTG_n$ as a whole. In the case where the modeling unit 26 determines reference signals ($\tilde{u}_1, \ldots, \tilde{u}_n$) on reactive power, the aggregated model takes compensation equipment, such as STATCOM, into account.

An estimated aggregated value $\Sigma \hat{y}_i$ for the electrical output parameter from all the wind turbine generators $WTG_1, WTG_2, \ldots, WTG_n$ of the wind power plant 10 is output from the wind turbine generator modeling block 26c. This aggregated estimated value $\Sigma \hat{y}_i$; is sent from the wind power plant modeling block 26c to the power plant controller 25. The aggregated estimated value $\Sigma \hat{y}_i$ is also sent to the conditioning block 26d. The conditioning block 26d estimates the influence of delays in the wind power plant 1 on the estimated aggregated values $\Sigma \hat{y}_i$ due to e.g. conditioning and/or communication delays, resulting in a delayed estimated aggregated value $\Sigma \hat{y}_{di}$. This delayed estimated aggregated value $\Sigma \hat{y}_{di}$ is outputted from the conditioning block 26d to a comparator unit 27.

As indicated in block 1 of FIG. 4, the raw measured signal $y_{mj}$ from the j'th wind turbine generator $WTG_j$ is conditioned in a conditioning block, and the result output from the N wind turbine generators is a conditioned, delayed (due to communication times within the wind power plant) and aggregated signal indicated by the term $\Sigma \hat{y}_{mdi}$, being an aggregated value of the measured signals $y_{md1}, \ldots, y_{mdn}$ from the wind turbine generators $WTG_1$ to $WTG_n$, influenced by the inherent conditioning and delay in the wind power plant. It should be noted that the aggregation of the measured signals $y_{md1}, \ldots, y_{mdn}$ may take place at the wind power plant control system 15".

The comparator unit 27 of the wind power plant control system 15" receives the aggregated measured signals $\Sigma y_{mdi}$ from the wind turbine generators 1 of the wind power plant 10. The comparator unit 27 is arranged to compare the delayed estimated aggregated values $\Sigma \hat{y}_{di}$ with aggregated measured signals $\Sigma y_{mdi}$ from the wind power plant, resulting in an error signal E'. The error signal E' is output from the comparator unit 27 to the turbine generator modeling block 26c, rendering it possible to perform a model plausibility check. Any perturbation of the model from the actual wind turbine performance is detected by the estimation error signal $\epsilon$'. Hereby, the model used by the wind turbine generator modeling block 26c may be updated at the rate of measurement of electrical output parameters from the wind turbine generators, e.g. every second.

Figure 5:
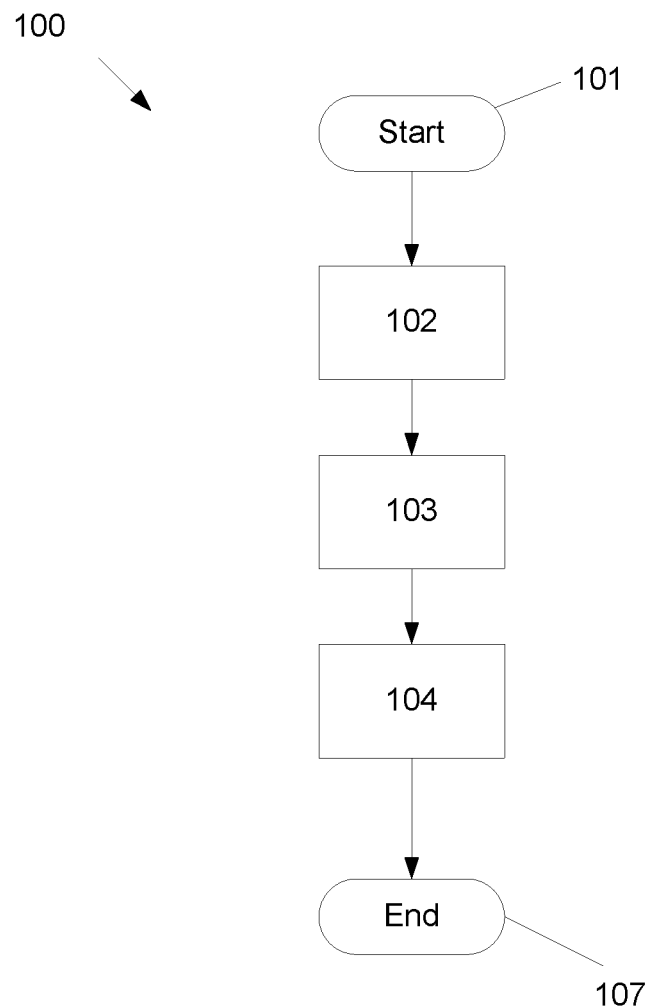
FIG. 5 illustrates a flow chart of a method according to the invention.

FIG. 5 illustrates a flow chart of a method 100 according to the invention. The method 100 relates to controlling a wind power plant comprising one or more wind turbine generators $WTG_1, WTG_2, \ldots, WTG_n$. A wind power plant control system 15, 15' or 15" comprises a power plant controller 25 and a modeling unit 26; 26', where the modeling unit 26; 26' is operatively coupled to the power plant controller 25 (see FIGS. 2-4 and the description thereof above).

The method starts in step 101 and continues to step 102, wherein the modeling unit 26; 26' calculates estimated values of electrical output parameters from the one or more wind turbine generators.

In a subsequent step 103, the modeling unit 26; 26' outputs the estimated values to the power plant controller.

In step 104, in the power plant controller determines, by use of said electrical output parameters, reference signals for dispatching to the one or more wind turbine generators. The method may also include (not shown in FIG. 5) a step of actually dispatch of reference signals from the power plant controller to the individual wind turbines.

The method ends in step 107.

The method 100 may further include the steps of dispatching the reference signals from the power plant controller to the modeling unit, and, in the modeling unit, calculating said estimated values based at least partly on said reference signals from the power plant controller.

The step 102 may include that the modeling unit receives measured values of said electrical output parameters from the one or more wind turbine generators of the wind power plant, and that a comparator unit of the modeling unit generates an estimation error signal indicative of the difference between the measured values and the estimated values of the electrical output parameters. The modeling unit updates the model used for estimating the values of the electrical output parameters by means of the estimation error signal.

In the method 100 measured values of the electrical output parameters from the one or more wind turbine generators may be transmitted at a first sampling rate, and the modeling unit may be arranged for outputting the estimated values at a second sampling rate, the second sampling rate being higher than the first sampling rate.

The reference signals determined by the power plant controller may for example be reference signals on active power, reactive power and/or any other appropriate electrical parameter.

The model used by the modeling unit may an electrical model of the one or more wind turbine generators of a wind power plant and the electrical grid inside the wind power plant or an aggregated model of the wind power plant.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A wind power plant control system arranged for controlling one or more wind turbine generators in a wind power plant,
   wherein the wind power plant control system comprises a power plant controller and a modeling unit, the modeling unit operatively coupled to the power plant controller,
   wherein the modeling unit uses a model for estimating values of electrical output parameters from the one or more wind turbine generators, the modeling unit configured to calculate estimated values of the electrical output parameters from the one or more wind turbine generators, and to output the estimated values to the power plant controller,
   wherein the modeling unit is configured to receive a respective measured signal from each of the one or more wind turbine generators, wherein each of the respective measured signals comprises respective measured values of the electrical output parameters from the one or more wind turbine generators of the wind power plant,
   wherein the modeling unit comprises a comparator configured to generate an estimation error signal indicative of a difference between the respective measured values and the estimated values,
   wherein the estimation error signal is used by the modeling unit to update the model,
   wherein the respective measured values are transmitted to the modeling unit at a first sampling rate determined by a time required for conditioning the respective measured signals of the one or more wind turbine generators and by a time required for communication between the one or more wind turbine generators and the wind power plant control system, and the modeling unit is configured to output the estimated values to the power plant controller at a second sampling rate, the second sampling rate being higher than the first sampling rate, wherein the second sampling rate is determined by a time required to calculate the estimated values of the electrical output parameters, and
   wherein, upon receiving the estimated values at the second sampling rate, the power plant controller is configured to determine reference signals for dispatching to the one or more wind turbine generators, wherein the reference signals are control values for controlling operation of the one or more wind turbine generators and wherein the estimated values of the electrical output parameters are used by the power plant controller in the determination of the reference signals.

2. The wind power plant control system according to claim 1, wherein the power plant controller is configured to also dispatch the reference signals to the modeling unit, and wherein the modeling unit is configured to calculate the estimated values based at least partly on the reference signals from the power plant controller.

3. The wind power plant control system according to claim 1, wherein the reference signals determined by the power plant controller are reference signals on active power or reactive power.

4. The wind power plant control system according to claim 1, wherein the modeling unit comprises an electrical model of the one or more wind turbine generators of the wind power plant and an internal grid of the wind power plant.

5. The wind power plant control system according to claim 1, wherein the modeling unit comprises an aggregated model of the wind power plant.

6. A method of controlling a wind power plant comprising one or more wind turbine generators by a wind power plant control system comprising a power plant controller and a modeling unit, the modeling unit operatively coupled to the power plant controller, the method comprising the steps of:
   using a model in the modeling unit for estimating values of electrical output parameters from the one or more wind turbine generators, the modeling unit calculating estimated values of electrical output parameters from the one or more wind turbine generators,
   outputting the estimated values from the modeling unit to the power plant controller,
   receiving a respective measured signal from each of the one or more wind turbine generators by the modeling unit, wherein each of the respective measured signals comprises respective measured values of the electrical output parameters from the one or more wind turbine generators of the wind power plant,
   generating an estimation error signal indicative of a difference between the respective measured values and the estimated values of the electrical output parameters in a comparator unit of the modeling unit,
   updating the model used by the modeling unit for estimating the values of the electrical output parameters by means of the estimation error signal,
   transmitting the respective measured values of the electrical output parameters to the modeling unit at a first sampling rate determined by a time required for conditioning the respective measured signals of the one or more wind turbine generators and by a time required for communication between the one or more wind turbine generators and the wind power plant control system, outputting the estimated values to the power plant controller at a second sampling rate, the second sampling rate being higher than the first sampling rate, wherein the second sampling rate is determined by a time required to calculate the estimated values of the electrical output parameters, and determining, upon receiving the estimated values at the second sampling rate, reference signals for dispatching to the one or more wind turbine generators in the power plant controller using the estimated values of the electrical output parameters, wherein the reference signals are control values for controlling operation of the wind turbine generators.

7. The method according to claim 6, wherein the method includes the steps of:

dispatching the reference signals from the power plant controller to the modeling unit, and calculating in the modeling unit the estimated values based at least partly on the reference signals from the power plant controller.

8. The method according to claim 6, wherein the reference signals determined by the power plant controller are reference signals on active power or reactive power.

9. The method according to claim 6, wherein the model used by the modeling unit is an electrical model of the one or more wind turbine generators of the wind power plant and an internal grid of the wind power plant.

10. The method according to claim 6, wherein the model used by the modeling unit is an aggregated model of the wind power plant.

11. A wind power plant comprising:

a wind power plant control system arranged for controlling one or more wind turbine generators in the wind power plant, wherein the wind power plant control system comprises a power plant controller and a modeling unit, the modeling unit operatively coupled to the power plant controller, wherein the modeling unit uses a model for estimating values of electrical output parameters from the one or more wind turbine generators, the modeling unit configured to calculate estimated values of the electrical output parameters from the one or more wind turbine generators, and to output the estimated values to the power plant controller, wherein the modeling unit is configured to receive a respective measured signal from each of the one or more wind turbine generators, wherein each of the respective measured signals comprises respective measured values of the electrical output parameters from the one or more wind turbine generators of the wind power plant, wherein the modeling unit comprises a comparator configured to generate an estimation error signal indicative of a difference between the respective measured values and the estimated values, wherein the estimation error signal is used by the modeling unit to update the model, wherein the respective measured values are transmitted to the modeling unit at a first sampling rate determined by a time required for conditioning the respective measured signals of the one or more wind turbine generators and by a time required for communication between the one or more wind turbine generators and the wind power plant control system, and the modeling unit is configured to output the estimated values to the power plant controller at a second sampling rate, the second sampling rate being higher than the first sampling rate, wherein the second sampling rate is determined by a time required to calculate the estimated values of the electrical output parameters, and wherein, upon receiving the estimate values at the second sampling rate, the power plant controller is configured to determine reference signals for dispatching to the one or more wind turbine generators, wherein the reference signals are control values for controlling operation of the wind turbine generators and wherein the estimated values of the electrical output parameters are used by the power plant controller in the determination of the reference signals.

* * * * *